United States Patent
De Vries et al.

(10) Patent No.: US 7,024,771 B2
(45) Date of Patent: Apr. 11, 2006

(54) METHOD OF MANUFACTURING A ROLLING ELEMENT BEARING WITH IMPROVED ROLLING CONTACT SURFACES

(75) Inventors: Alexander Jan Carel De Vries, Tiel (NL); Armin Herbert Emil August Olschewski, Nieuwegein (NL); John Howard Tripp, Bilthoven (NL); Pieter Martin Lugt, Vianen (NL)

(73) Assignee: SKF Engineering & Research Centre B.V., Nieuwegein (NL)

( * ) Notice: Subject to any disclaimer, the term of this patent is extended or adjusted under 35 U.S.C. 154(b) by 568 days.

(21) Appl. No.: 10/080,714

(22) Filed: Feb. 25, 2002

(65) Prior Publication Data

US 2002/0073548 A1 Jun. 20, 2002

Related U.S. Application Data

(62) Division of application No. 09/486,210, filed as application No. PCT/NL98/00518 on Sep. 8, 1998, now Pat. No. 6,371,656.

(30) Foreign Application Priority Data

Sep. 8, 1997 (NL) .................................... 1006971

(51) Int. Cl.
*B21D 53/10* (2006.01)
(52) U.S. Cl. .................................... 29/898.13; 29/898.06
(58) Field of Classification Search .................. 29/898, 29/898.06, 898.13, 90.7, 724; 384/565, 516, 384/513, 569, 571
See application file for complete search history.

(56) References Cited

U.S. PATENT DOCUMENTS

| | | | |
|---|---|---|---|
| 4,258,084 A | * | 3/1981 | Hayden, Sr. |
| 4,718,155 A | * | 1/1988 | Warriner et al. |
| 5,019,738 A | * | 5/1991 | Weilbach et al. |
| 5,456,538 A | | 10/1995 | Honda et al. |
| 5,498,086 A | | 3/1996 | Ou |
| 5,584,586 A | * | 12/1996 | Casarcia et al. |
| 5,592,840 A | * | 1/1997 | Miyasaka |
| 5,641,038 A | | 6/1997 | Akamatsu |
| 6,338,574 B1 | * | 1/2002 | Shimizu et al. |

FOREIGN PATENT DOCUMENTS

| | | |
|---|---|---|
| EP | 0 711 929 A1 | 5/1996 |
| GB | 2 238 584 A | 6/1991 |
| JP | 3-189415 | 8/1991 |
| JP | 4 321816 | 11/1992 |
| JP | A-5-240254 | 9/1993 |
| JP | 6-241235 | 8/1994 |
| JP | 9 038368 | 2/1997 |
| WO | WO 97/19279 | 5/1997 |

\* cited by examiner

*Primary Examiner*—T. Nguyen
(74) *Attorney, Agent, or Firm*—Oliff & Berridge, PLC

(57) ABSTRACT

A method of manufacturing a roller element bearing comprising an inner ring, an outer ring, and a series of rolling elements. A rolling surface of each rolling element is in contact with a raceway surface formed in each of the inner and the outer rings. At least one of the raceway surfaces of the inner and outer rings and the rolling surfaces of the rolling elements is provided with a topography comprising recesses which are generally isolated by lands. The recesses are formed by shot peening at least one of the surfaces. In addition, the recesses are provided with lubricant.

5 Claims, 1 Drawing Sheet

METHOD OF MANUFACTURING A ROLLING ELEMENT BEARING WITH IMPROVED ROLLING CONTACT SURFACES

This is a Division of application Ser. No. 09/486,210 filed Mar. 23, 2000 now U.S. Pat. No. 6,371,656 which is a 371 of PCT/NL98/00518 filed Sep. 8, 1998. The entire disclosure of the prior application(s) is hereby incorporated by reference herein in its entirety.

BACKGROUND OF THE INVENTION

1. Field of the Invention

The invention is related to a rolling elements, the rolling surface of which is in contact with a raceway of both rings, at least one of the surfaces of the rings and the rolling elements being provided with a topography comprising recesses which are generally isolated from each other by lands and which may contain a lubricant, said recesses having a maximum diameter of 100 micrometer in a direction parallel to the surface in question.

2. Description of Related Art

Such rolling element bearing is disclosed in WO-A-9719279.

SUMMARY OF THE INVENTION

The object of this invention is to provide a rolling element bearing wherein a good compromise is achieved between a sufficient lubrication capacity on the one hand, and only a small disturbance of the running properties on the other hand.

Said object is achieved in that the recesses have a minimum diameter of 14 micrometer, and in that, in a cross section, the average angle α defined by the intersection of the wall of a recess and the adjacent surface is less than 5 degrees.

The recesses with such size appear to behave as pockets which are flattened during overrolling, resulting in an extra amount of lubricant being expelled and fed into the contact as an EHL (elasto-hydrodynamic lubrication) lubricant film. Thereby, the rolling surfaces will be separated already at a lower speed.

Preferably, the average size of the recesses in a direction parallel to the surface is 50 micrometer. Further, the recesses may have a maximum depth of 4 micrometer; preferably, the recesses have an average depth of less than 0.5 micrometer. The depth preferred is about 0.2 µm.

It appears that the geometry of the recesses is of importance for obtaining a good lubricant film at low speeds. In particular, it appears to be advantageous in case, in a cross section, the average angle defined by the intersection of the wall of a recess and the adjacent surface is less than 2 degrees.

Thereby, an improved lubrication may be obtained in combination with improved fatigue life properties. The average surface area may be more than 150 µm.

In this respect, it is preferred that the recesses are spherically shaped. A spherical geometry provides a well defined recess, having the required lubricant holding capacity and providing the possibility to locate the recesses close to each other in a non-overlapping way, thus maintaining lands which isolate the recesses from each other. Such recesses may be obtained by a peening operation.

According to a first possibility, the topography comprising recesses may be applied to at least one of the rolling surfaces of the rolling elements, and/or at least one of the raceways of the rings.

The topography in a direction transverse with respect to the direction of rolling may be varying. For instance, the depth and/or the density of the recesses (number of recesses per unity of surface area) may be varying. This embodiment of the rolling bearing according to the invention is in particular useful in the case of varying lubrication requirements.

According to a second possibility, the topography comprising recesses may be applied in a roller bearing wherein at least glass beads are used in the shot peening operation.

The invention is furthermore related to a method for manufacturing a rolling element or a ring for a bearing as described before, wherein at least one of the rolling surfaces and the raceways is provided with a topography comprising recesses which are generally isolated from each other by lands and which may contain a lubricant, which topography in a direction transverse with respect to the direction of rolling is varying. Preferably, glass beads are used in the shot peening operation. The diameter of the glass beads should be about 200 micrometer.

The invention will now be described further with reference to the figures.

DETAILED DESCRIPTION OF THE PREFERRED EMBODIMENTS

Figure 1:
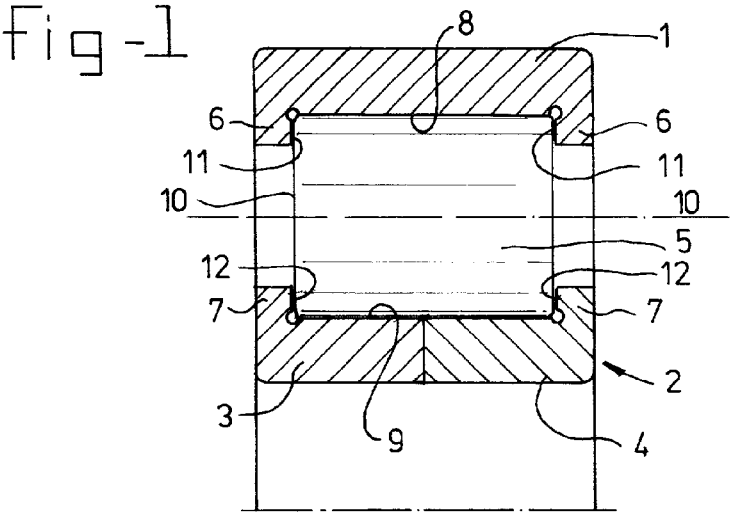
FIG. 1 shows a cross-section through a single row cylindrical roller bearing.

The cylindrical roller bearing according to FIG. 1 comprises an outer ring 1, an inner ring 2 consisting of two halves 3, 4, as well as a series of cylindrical rollers 5

Both the outer ring 1 and the inner ring 2 have two integral flanges 6 respectively 7. Between these flanges, raceways 8 respectively 9 have been defined.

The cylindrical rollers have flat end faces 10, which can slidably contact the facing surfaces 11 respectively 12 of the integral flanges 6 respectively 7.

Figure 2:
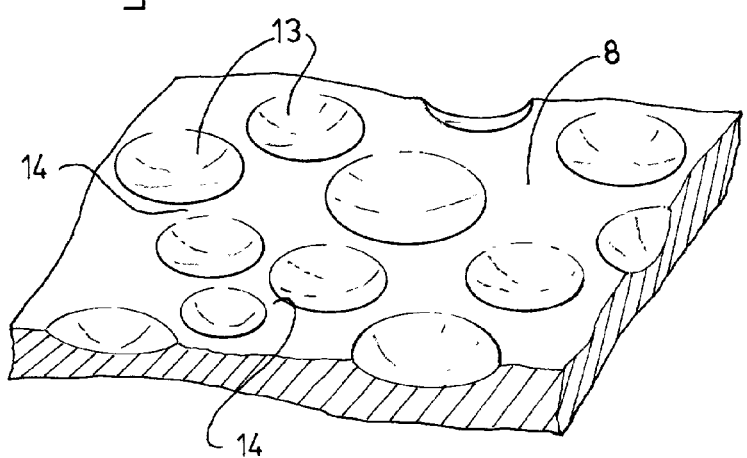
FIG. 2 shows a detail of a surface of the bearing according to FIG. 1.

According to the invention, at least one of the surfaces of the rolling elements 5 and/or the rings 1, 2 may be provided with a surface topography as shown in FIG. 2. The surface in question may be the rolling surface of the cylindrical rollers 5, their end faces 10, or the raceways 8, 9 and/or the facing surfaces 11, 12 of integral flanges 6,7.

As shown in FIG. 2 said topography of e.g. raceway 8 comprises a number of spherically shaped recesses 13, which may have varying dimensions. These spherically recesses 13 are e.g. obtained by means of shot blasting glass beads. The recesses 13 are generally isolated from each other by means of lands 14 which are part of the raceway 8 in question. The recesses 13 constitute small pockets in which oil may be trapped. When a rolling element overrolls with the recesses 13, they are compressed somewhat, whereby the oil is expelled and a better lubrication is obtained._

Figure 3:
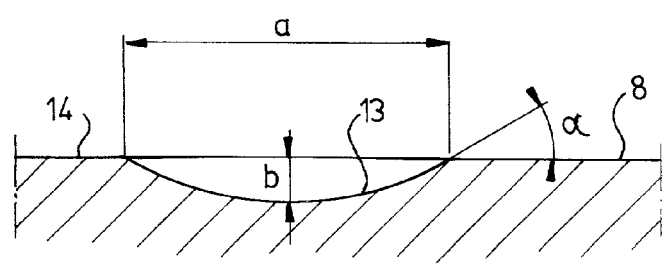
FIG. 3 shows a cross-section through said surface.

FIG. 3 shows a cross-section of recess 13. According to the invention, their maximum size a in a direction parallel to the raceway 8 is 100 μm. Furthermore, their maximum depth is 4 μm. The average depth of the recesses is preferably 0.2 μm.

In order to guarantee a smooth overrolling of the recesses 13 by the rolling elements, the average angle α defined by the intersection of the wall of the recess 13 and the adjacent land 14 is 2°.

What is claimed is:

1. A method of manufacturing a roller element bearing comprising an inner ring, an outer ring, and a series of rolling elements, a rolling surface of each rolling element in contact with a raceway surface formed in each of the inner and the outer rings, at least one of the raceway surfaces of the inner and outer rings and the rolling surfaces of the rolling elements being provided with a topography comprising recesses which are generally isolated by lands, the method comprising:

forming the recesses by shot peening the at least one of the surfaces, wherein an average angle α between a wall of each recess on the at least one surface is less than 5 degrees, α being the angle between the tangent to the wall, at the intersection of the wall and the adjacent land, and the adjacent land.

2. The method of claim 1, further comprising forming the recesses to have a maximum diameter of 100 micrometers and a minimum diameter of 14 micrometers.

3. The method of claim 1, further comprising using glass beads to do the shot peening.

4. The method according to claim 3, wherein the diameter of each glass bead is about 200 micrometers.

5. The method of claim 1, further comprising providing the recesses with lubricant.

* * * * *